United States Patent
Kitamura

(10) Patent No.: US 11,298,781 B2
(45) Date of Patent: Apr. 12, 2022

(54) WORKPIECE ROTATING APPARTUS AND ROBOT SYSTEM

(71) Applicant: FANUC CORPORATION, Yamanashi (JP)

(72) Inventor: Ryouji Kitamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/839,460

(22) Filed: Apr. 3, 2020

(65) Prior Publication Data
US 2020/0368854 A1 Nov. 26, 2020

(30) Foreign Application Priority Data
May 23, 2019 (JP) .............................. JP2019-096756

(51) Int. Cl.
| | | |
|---|---|---|
| *B23K 37/04* | (2006.01) | |
| *B23K 37/047* | (2006.01) | |
| *B23Q 15/013* | (2006.01) | |
| *B23Q 17/00* | (2006.01) | |

(52) U.S. Cl.
CPC .......... *B23K 37/047* (2013.01); *B23Q 15/013* (2013.01); *B23Q 17/005* (2013.01)

(58) Field of Classification Search
CPC .. B23K 37/047; B23K 37/0452; B23K 37/00; B23K 37/04–0538; B23Q 15/013; B23Q 17/005; B23Q 1/25; B23Q 1/58; B23Q 1/525
USPC .............................. 228/44.3–44.7, 47.1–49.6
See application file for complete search history.

(56) References Cited

U.S. PATENT DOCUMENTS

| | | | |
|---|---|---|---|
| 7,837,084 B2 * | 11/2010 | Simmons ........... | B23K 37/0443 228/102 |
| 2009/0121113 A1 * | 5/2009 | Yasuda .................. | B23Q 1/017 248/429 |
| 2010/0262275 A1 * | 10/2010 | Schoening ........... | B23K 20/023 700/213 |
| 2015/0298249 A1 * | 10/2015 | Buchler ................. | B29C 65/06 156/64 |

(Continued)

FOREIGN PATENT DOCUMENTS

| | | |
|---|---|---|
| JP | H0679461 A | 3/1994 |
| JP | H06292991 A | 10/1994 |
| JP | H07164188 A | 6/1995 |

(Continued)

*Primary Examiner* — Kiley S Stoner
(74) *Attorney, Agent, or Firm* — Karceski IP Law, PLLC

(57) ABSTRACT

A workpiece rotating apparatus including a first rotary positioner and a second rotary positioner which are arranged to face each other in a direction along a substantially horizontal rotation axis, which hold, respectively, one end portion and the other end portion of a long workpiece, and which can rotate the workpiece around the rotation axis, a linear motor which linearly moves the second rotary positioner in a direction along the rotation axis, and a motor controller which controls the linear motor to adjust a position of the second rotary positioner in a direction along the rotation axis, and the motor controller controls the linear motor so that magnitude of force acting on the linear motor from the other end portion of the workpiece via the second rotary positioner becomes equal to or smaller than a predetermined threshold.

5 Claims, 8 Drawing Sheets

(56) References Cited

U.S. PATENT DOCUMENTS

2016/0016267 A1* 1/2016 Beatty ................ B23K 37/0452
                                                  29/559
2019/0070699 A1* 3/2019 Itou ........................ B23Q 16/10

FOREIGN PATENT DOCUMENTS

| JP | 2850089 B2 | 1/1999 | |
|----|------------|--------|---|
| WO | WO-2006002820 A2 * | 1/2006 | ............. B23K 20/12 |
| WO | WO-2016131857 A1 * | 8/2016 | ........... B23K 20/227 |

* cited by examiner

WORKPIECE ROTATING APPARTUS AND ROBOT SYSTEM

CROSS-REFERENCE TO RELATED APPLICATIONS

This application is based on and claims priority to Japanese Patent Application No. 2019-096756, filed on May 23, 2019, the entire content of which is incorporated herein by reference.

FIELD OF THE INVENTION

This invention relates to a workpiece rotating apparatus and a robot system.

BACKGROUND OF THE INVENTION

Conventionally, in a robot system for welding workpiece by means of a robot, a workpiece rotating apparatus, which horizontally supports a long workpiece, and rotates the workpiece around a rotation axis of the workpiece extending in a longitudinal direction, is used (for example, see Japanese Unexamined Patent Application, Publication No. H07-164188 and Japanese Unexamined Patent Application, Publication No. H06-292991). The workpiece rotating apparatus has a pair of rotary positioners which are arranged to face each other in a horizontal direction, and which holds both ends of the workpiece, and at least one of the rotary positioners is linearly movable along the rotation axis line.

SUMMARY OF THE INVENTION

An aspect of the present disclosure is a workpiece rotating apparatus which includes a first rotary positioner and a second rotary positioner which are arranged to face each other in a direction along an approximately horizontal rotation axis, and which hold, respectively, one end portion and the other end portion of a long workpiece extending parallel to the rotation axis, and which can rotate the workpiece around the rotation axis, a linear motor which linearly moves the second rotary positioner in the direction along the rotation axis, a motor controller which controls the linear motor to adjust a position of the second rotary positioner in the direction along the rotation axis, wherein, the motor controller controls the linear motor so that magnitude of force acting on the linear motor from the other end portion of the workpiece via the second rotary positioner becomes smaller than a predetermined threshold.

DESCRIPTION OF EMBODIMENT(S) OF THE INVENTION

A workpiece rotating apparatus 1 and a robot system 10 in accordance with a first embodiment will be described below with reference to the accompanying drawings.

Figure 1:
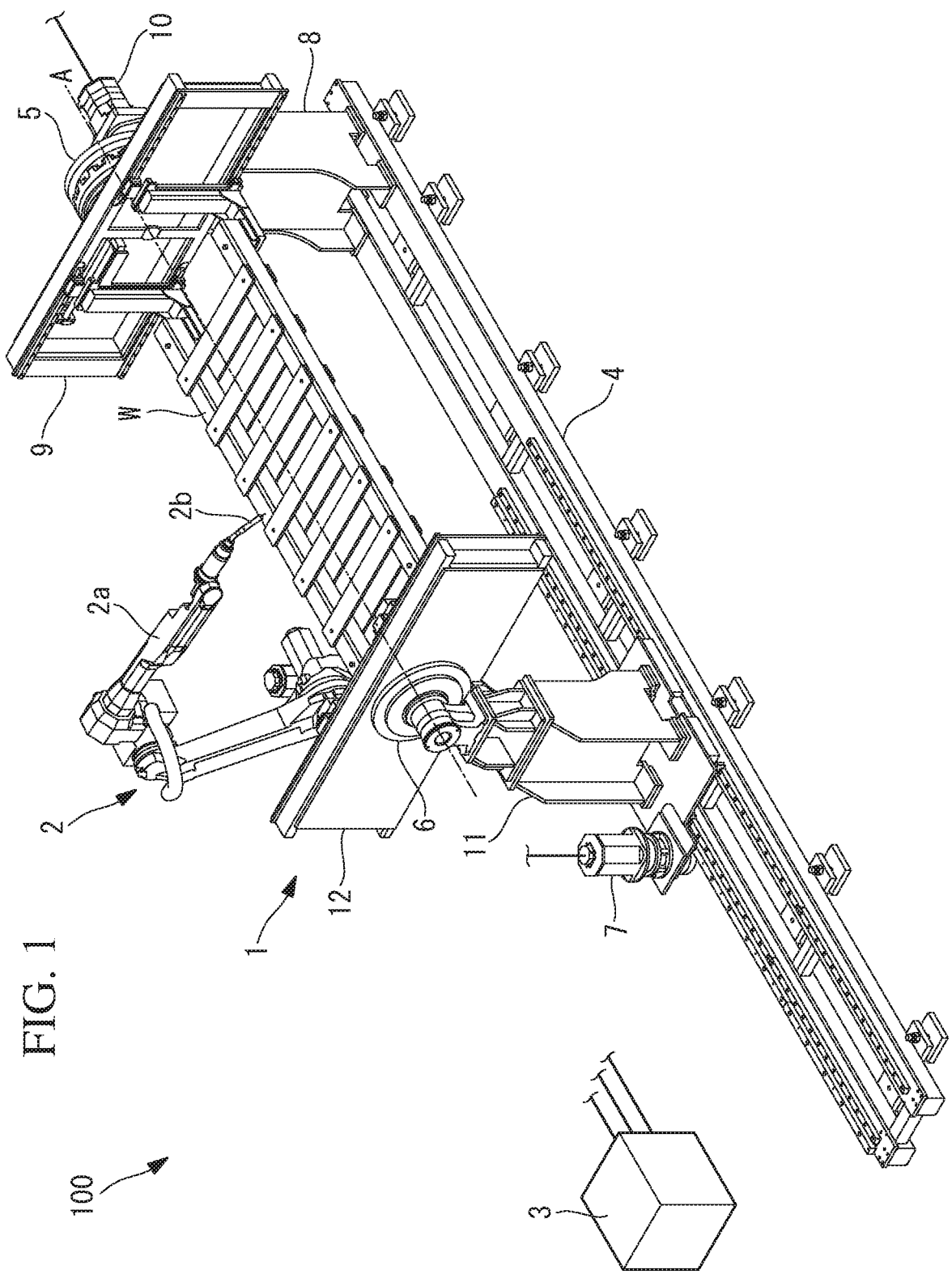
FIG. 1 is a perspective view showing an entire configuration of a robot system according to an embodiment of the present invention.
Figure 2:
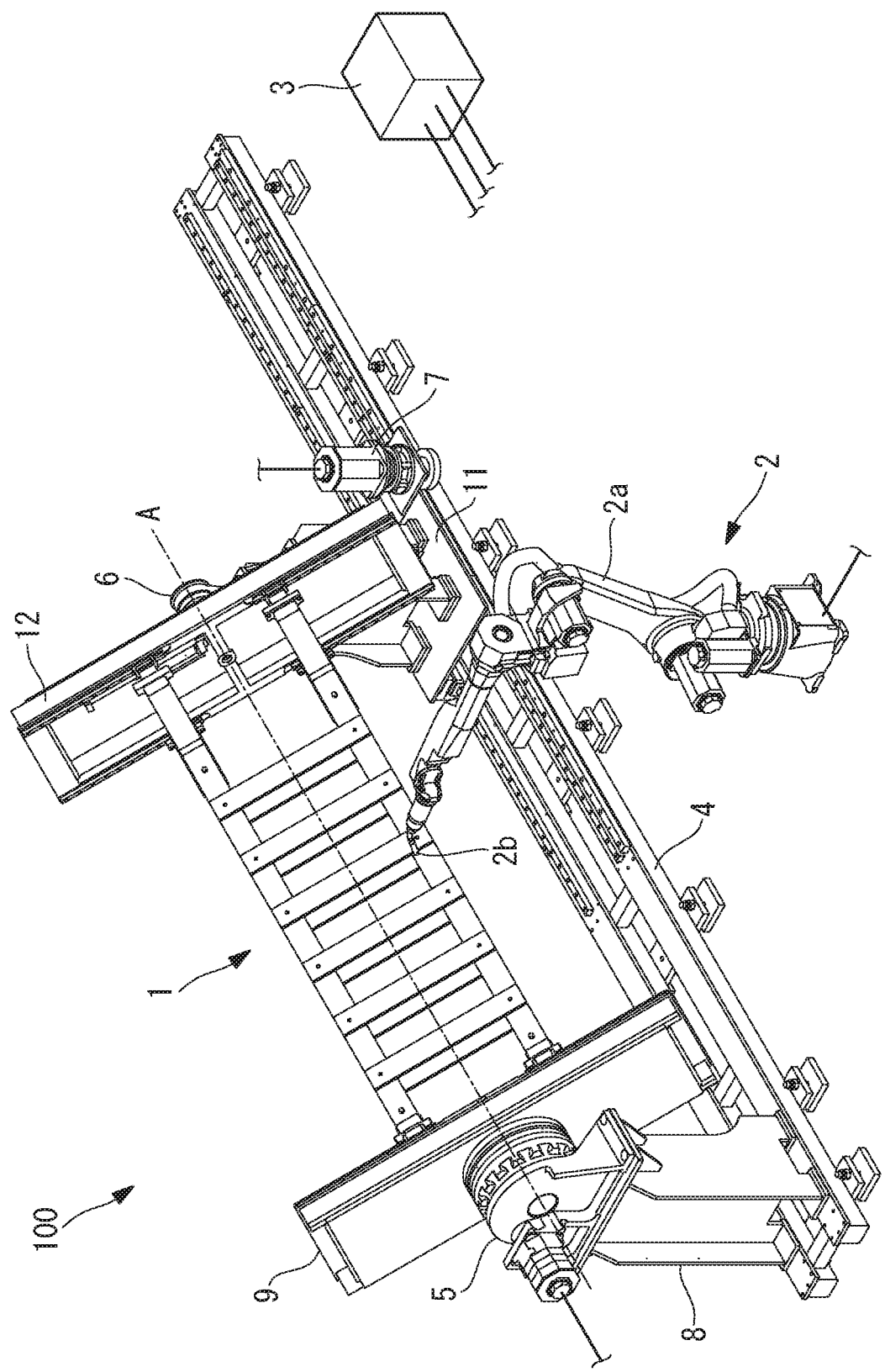
FIG. 2 is a perspective view of the robot system of FIG. 1, which is seen from another direction.

As shown in FIGS. 1 and 2, the robot system 100 includes the workpiece rotating apparatus 1 which supports a long workpiece W so as to be positioned in a substantially horizontal orientation, a welding robot 2 for welding the workpiece W, and a controller 3.

The workpiece rotating apparatus 1 has a substantially horizontal rotation axis A, and by rotating the workpiece W which are supported parallel to the rotation axis A around the rotation axis A, the workpiece rotating apparatus 1 is capable of changing posture of the workpiece W. More specifically, the workpiece rotating apparatus 1 includes a linear and long rail 4 which extends in a horizontal direction, a first rotary positioner 5 and a second rotary positioner 6 which are arranged on the rail 4, and which hold both end portions of the workpiece W, and a linear motor 7 which linearly moves the second rotary positioner 6 along the rail 4. The rotation axis A is parallel to the rail 4, and the rotary positioners 5 and 6 are arranged facing each other in a direction along the rotation axis A.

The first rotary positioner 5 is provided on a fixing table 8 fixed at one end portions of the rail 4, and a jig 9 for fixing one end portion of the workpiece W is attached to the first rotary positioner 5. Also, a rotational motor 10 is provided in the first rotary positioner 5. The rotational motor 10 is a servo motor. The first rotary positioner 5 can rotate the jig 9 and the one end portion of the workpiece around the rotation axis A by the rotational motor 10. Also, the first rotary positioner 5 positions the jig 9 and the one end portion of the workpiece W around the rotation axis A by the rotational motor 10, and is capable of holding the workpiece W in an arbitrary posture around the rotation axis A.

The second rotary positioner 6 is arranged on a movable table 11 which is movable along the rail 4, and a jig 12 for fixing the other end portion of the workpiece W is attached to the second rotary positioner 6. The second rotary positioner 6 holds the jig 12 rotatably around the rotation axis A. Therefore, the other end portion of the workpiece W held by the second rotary positioner 6 rotates in accordance with the rotation of the one end portion of the workpiece W by the first rotary positioner 5, and the entire workpiece W rotates around the rotation axis A.

The linear motor 7 is a servo motor. The linear motor 7 is controlled by a linear motor controller 14, which will be described below, so that the movable table 11 is moved to a target position along the rail 4, and the movable table 11 is held at the target position. Therefore, positions of the movable table 11 and the second rotary positioner 6 may be changed according to length of the workpiece W, and a plurality of kinds of workpieces having different length can be held by the same workpiece rotating apparatus 1.

Figure 3:
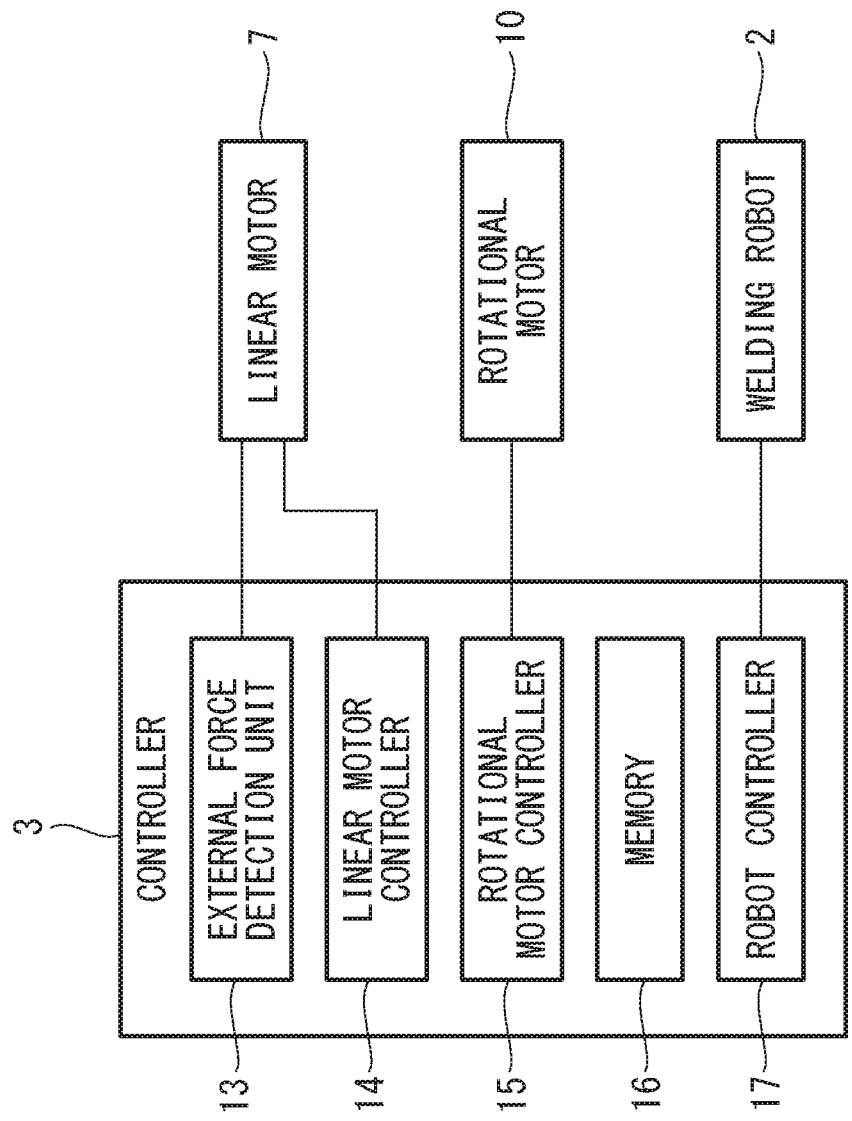
FIG. 3 is a block diagram showing a configuration of a controller of the robot system of FIG. 1.

Also, as shown in FIG. 3, the workpiece rotating apparatus 1 includes an external force detection unit 13 which detects eternal force acting on the linear motor 7, a linear motor controller 14 which controls the linear motor 7, and a rotational motor controller 15 which controls the rotational motor 10. The external force detection unit 13, the linear motor controller 14, and the rotational motor controller 15 are provided within the controller 3 connected to the motors 7, 10, and the welding robot 2.

The controller 3 is provided with a memory 16 having a RAM, a ROM, and the like. The motor controllers 14, 15 respectively control the motors 7, 10 in accordance with an operation program for the workpiece rotating apparatus 1 stored in the memory 16.

The external force detection unit 13 detects magnitude and a direction of the external force acting on the linear motor 7 from the other end portion of the workpiece W via the second rotary positioner 6. For example, on the basis of driving current of the linear motor 7, the external force detection unit 13 detects magnitude and a direction of load torque which is applied to the linear motor 7.

Figure 4:
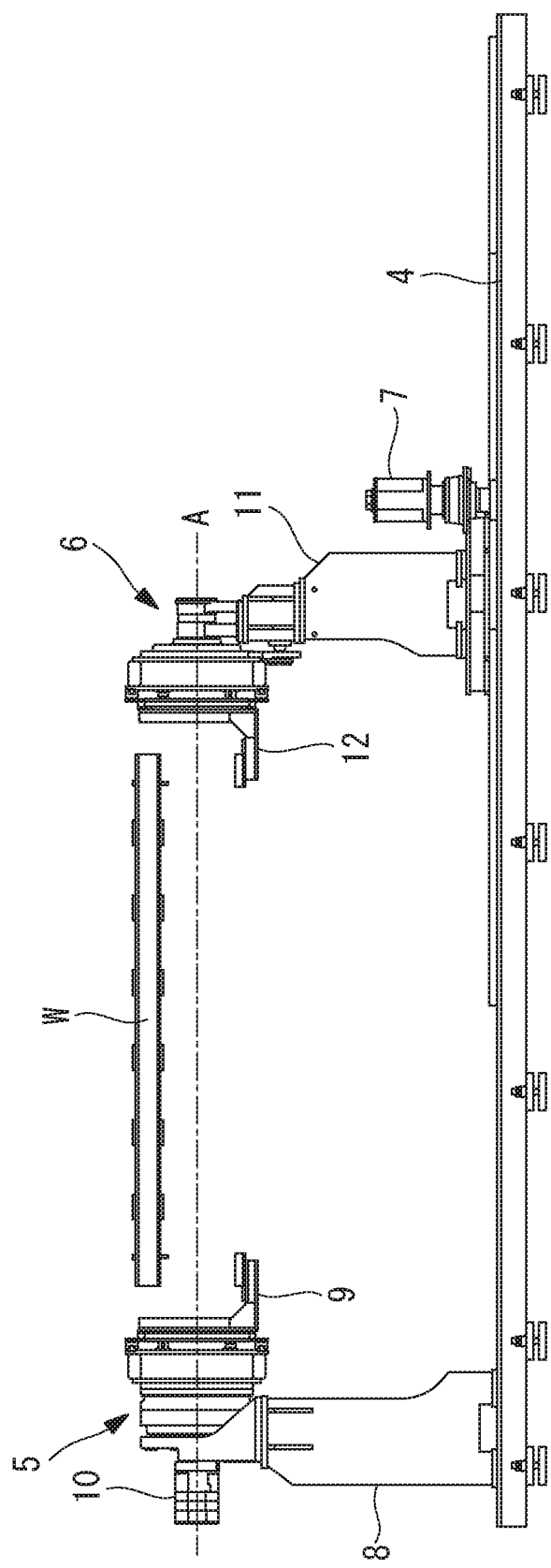
FIG. 4 is a side view of a workpiece rotating apparatus.
Figure 5:
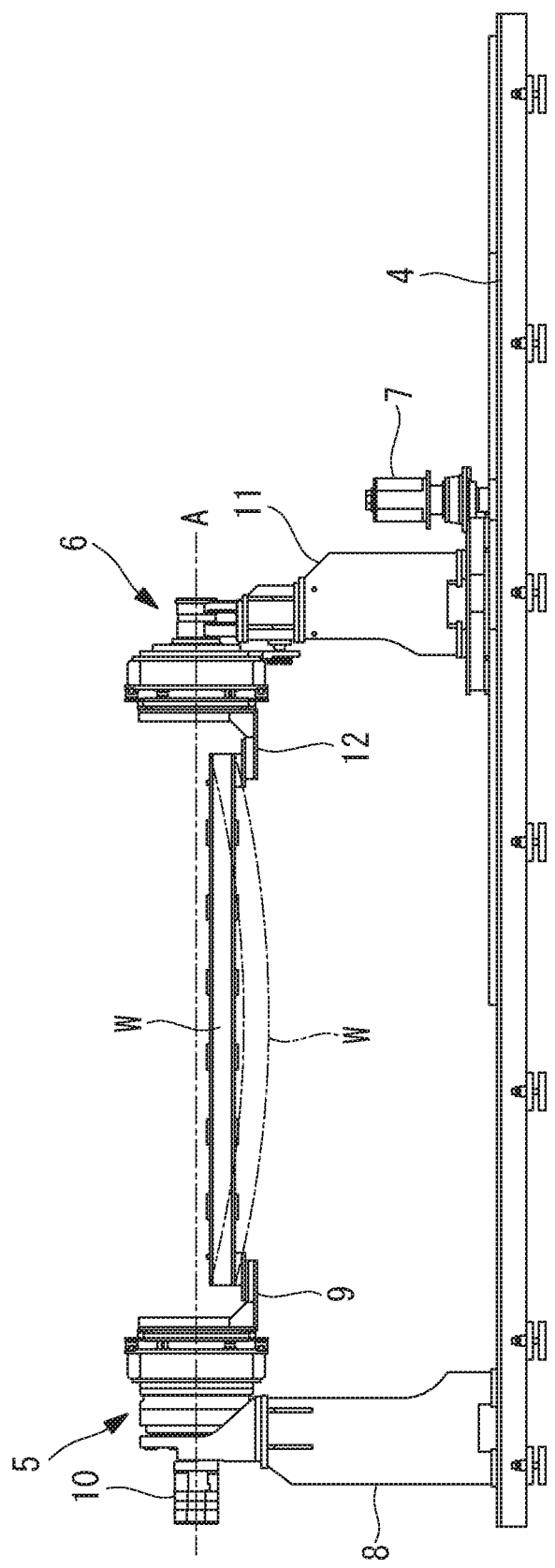
FIG. 5 is a diagram which explains bending of the workpiece when posture of the workpiece is 0 degree.

In FIGS. 4 to 7, relationship between the posture of the workpiece W around the rotation axis A, which are supported by the rotary positioners 5, 6, and bending of the workpiece is explained. As shown in FIGS. 4 and 5, the second rotary positioner 6 is held by the linear motor 7 at a position corresponding to the length of the workpiece W at the time of attaching the workpiece W to the rotary positioners 5, 6.

Figure 7:
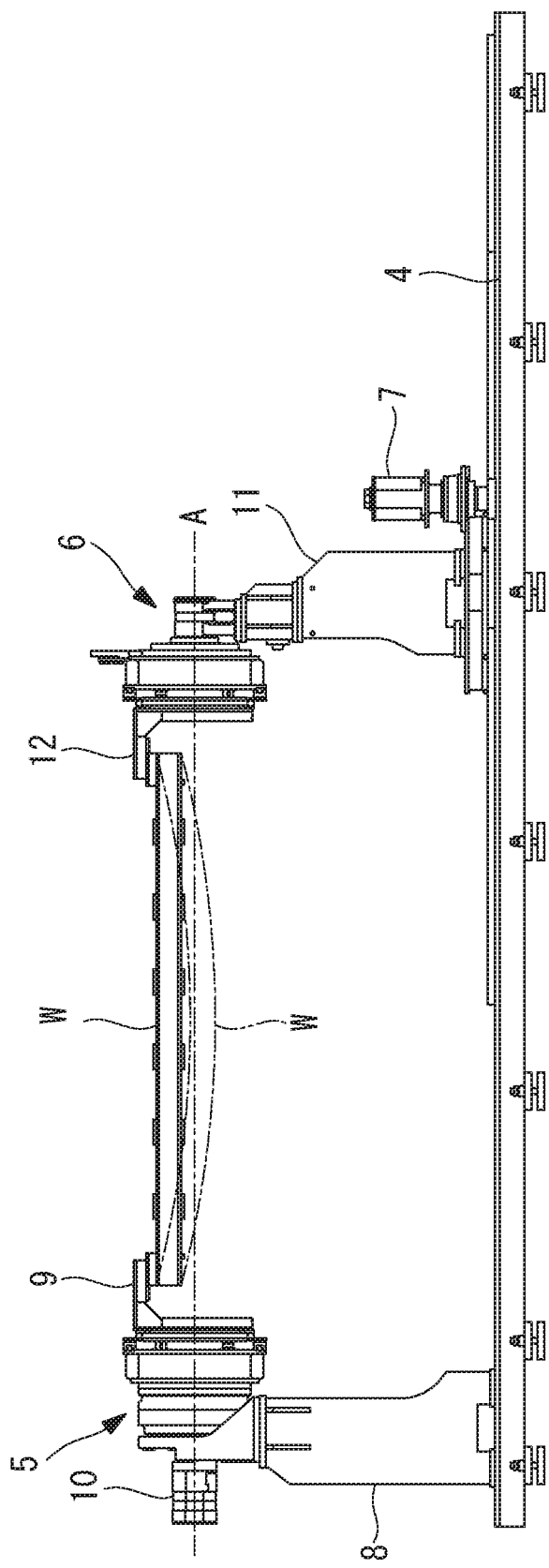
FIG. 7 is a diagram which explains the bending of the workpiece when the posture of the workpiece is 180 degrees.

The long workpiece W which is horizontally held by the rotary positioners 5, 6 may be bent by their own weight, as indicated by dash-dot lines in FIGS. 5 and 7. When the amount of bending of the workpiece W changes due to the change in the posture of the workpiece W around the rotation axis A, the other end of the workpiece W is displaced in a direction close to or away from the one end of the workpiece W, therefore, tensile force or pressing force acts on the second rotary positioner 6 from the other end portion of the workpiece W, and the external force based on the tensile force or the pressing force acts on the linear motor 7.

Figure 6:
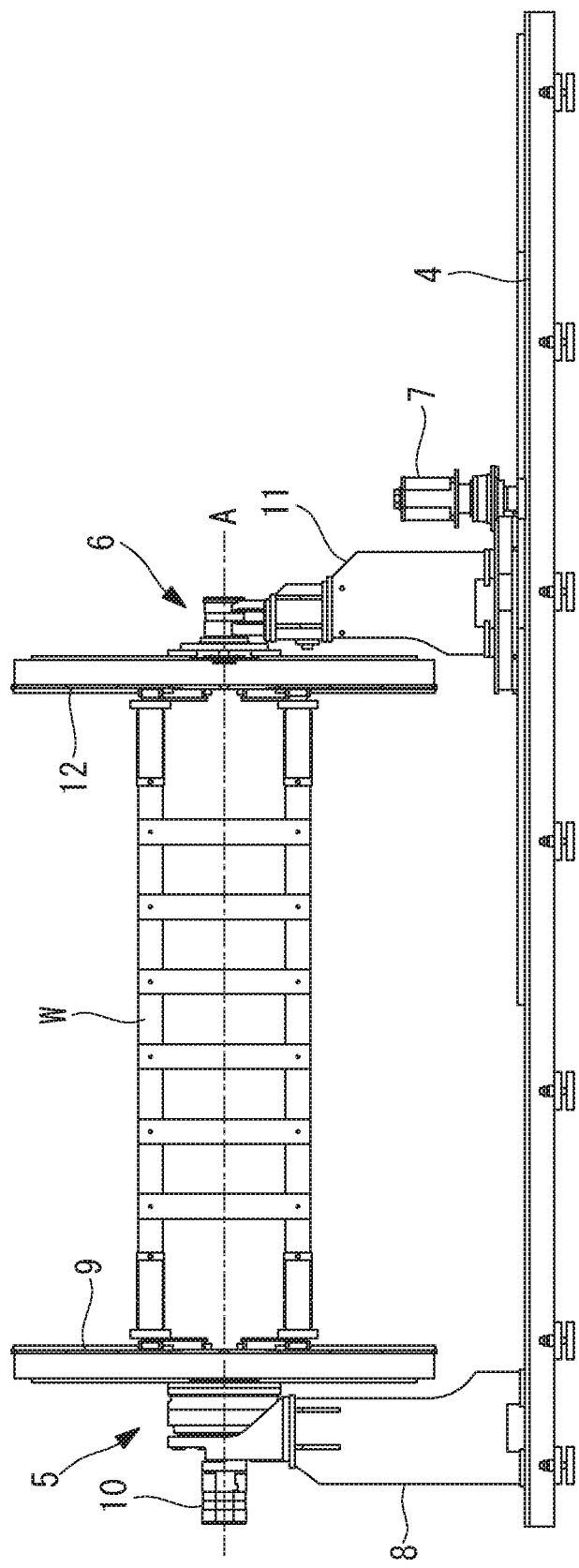
FIG. 6 is a diagram which explains the bending of the workpiece when the posture of the workpiece is 90 degrees.

In FIGS. 4 to 7, the posture of the workpiece W in FIGS. 4 and 5 is 0 degree, the posture of the workpiece W in FIG. 6 is 90 degrees, and the posture of the workpiece W in FIG. 7 is 180 degrees. In such a case where the posture of the workpiece W is 0 degree and 180 degrees, the workpiece W is largely bent by its own weight.

When the posture of the workpiece W is changed from 0 degree to 90 degrees, the amount of bending of the workpiece W reduces, and the other end of the workpiece W is displaced in the direction away from the one end of the workpiece W. For that reason, the pressing force in a direction toward an opposite side from the first rotary positioner 5 acts on the second rotary positioner 6 from the other end portion of the workpiece W. On the other hand, when the posture of the workpiece W is changed from 90 degrees to 180 degrees, the amount of bending of the workpiece W is increased, and the other end of the workpiece W is displaced in the direction close to the one end of the workpiece W. For that reason, the tensile force in a direction toward the first rotary positioner 5 acts on the second rotary positioner 6 from the other end portion of the workpiece W.

When the tensile force or the pressing force acts on the second rotary positioner 6 from the workpiece W in the above described manner, the linear motor 7 acts against the tensile force or the pressing force so as to hold the second rotary positioner 6 at the target position, and therefore, the load torque based on the tensile force or the pressing force is applied to the linear motor 7. At this time, there is a case where the linear motor 7 may not be able to hold the second rotary positioner 6 at the target position, and the second rotary positioner 6 is moved from the target position due to the change in the amount of bending of the workpiece W. In such a case where the workpiece W is long and heavy, movement amount of the rotary positioner 6 at this time may be a few mms, for example.

The linear motor controller 14 controls the linear motor 7 so as to adjust the position of the second rotary positioner 6 on the basis of the magnitude and the direction of the load torque which are detected by the external force detection unit 13.

More specifically, in such a case where the magnitude of the load toque is smaller than a predetermined threshold, the linear motor controller 14 controls the linear motor 7 so as to hold the rotary positioner 6 at the present target position. The predetermined threshold is a value which is smaller than the magnitude of the maximum torque of the linear motor 7.

On the other hand, in such a case where the magnitude of the load torque is larger than the predetermined threshold, on the basis of the direction of the load torque, the linear motor controller 14 changes the target position to the direction in which the load torque becomes smaller, and controls the linear motor 7 so as to displace the second rotary positioner 6 to the target position. As a result, the second rotary positioner 6 is displaced so as to allow the displacement of the other end portion of the workpiece W caused by the change in the amount of bending of the workpiece W, and the tensile force or the pressing force acting on the second rotary positioner 6 from the other end portion of the workpiece W becomes smaller. The linear motor controller 14 moves the second rotary positioner 6 to a target position where the magnitude of the load torque detected by the external force detection unit 13 becomes smaller than the predetermined threshold.

The linear motor controller 14 may generate an alarm on the basis of the load torque detected by the external force detection unit 13. For example, the linear motor controller 14 starts clocking when the load torque reaches to the maximum torque, and in such a case where the maximum torque has been detected continuously over a predetermined time period, the linear motor controller 14 generates the alarm and stops the linear motor 7.

The welding robot 2 has a robot arm 2a, and a welding torch 2b is connected to a distal end of the robot arm 2a. The welding robot 2 is a six-axis vertical articulated robot, for example. The welding robot 2 welds the workpiece W which are arranged in the proximity of the rail 4, and which are supported by the workpiece rotating apparatus 1. For example, in such a case where the workpiece W is in a rectangular shape having four side surfaces, the workpiece rotating apparatus 1 rotates the workpiece W by 90 degrees each time the welding robot 2 welds a welding position on the respective four side surfaces of the workpiece W, and therefore, the four side surfaces of the workpiece W can sequentially be welded by the welding robot 2.

The welding robot 2 is controlled by the robot controller 17 provided in the controller 3. The robot controller 17 synchronizes with the control of the motors 7, 10, which is performed by the motor controller 14, so as to control the welding robot 2 in accordance with the operation program for the welding robot 2 stored in the memory 16. The welding position of the welding robot 2 is set by touch sensing, in which a distal end of the welding torch 2b is brought into contact with the welding position on the workpiece W, for example.

Figure 8:
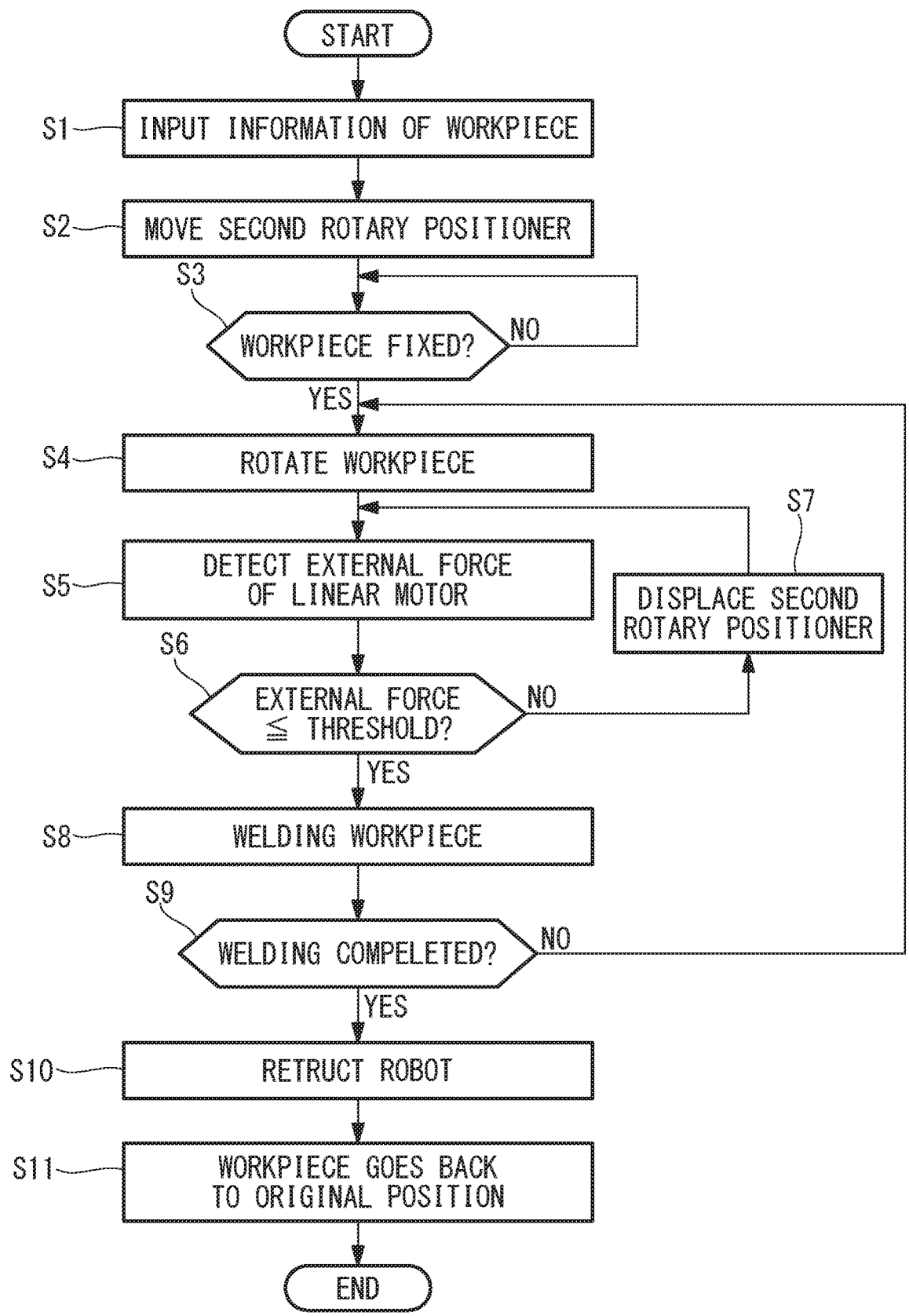
FIG. 8 is a flowchart showing an operation of the workpiece rotating apparatus and the robot system.

Then, operation of the robot system 100 will be described below with reference to FIG. 8. Firstly, information of the workpiece W is input to the controller 3 by an operator (Step S1). The information of the workpiece W includes a type, a dimension, and the like of the workpiece W, for example.

Secondly, the second rotary positioner 6 is moved to an appropriate position for holding the other end portions of the workpiece W by driving the linear motor 7 (Step S2). On the basis of the information of the workpiece W, or on the basis of operation by the operator, the second rotary positioner 6 is moved by controlling the linear motor 7 by the linear motor controller 14.

Then, the operator fixes the one end portion of the workpiece W to the jig 9 of the first rotary positioner 5, and fixes the other end portion of the workpiece W to the jig 12 of the second rotary positioner 6 so that the workpiece W is supported by the workpiece rotating apparatus 1, as shown in FIGS. 4 and 5. The jigs 9, 12, and the workpiece W at this time are arranged in predetermined original posture (0 degree, for example) around the rotation axis A, for example.

After the workpiece W is fixed to the workpiece rotary apparatus 1 (YES in Step S3), the rotational motor controller 15 rotates the workpiece W by controlling the rotational motor 10 as necessary, and arranges the workpiece W in first posture (0 degree, for example) (Step S4). The rotational motor controller 15 determines that the workpiece W is fixed to the workpiece rotation apparatus 1 on the basis of predetermined input to the controller 3 by the operator, for example.

Next, the external force detection unit 13 detects the external force, such as the load torque for example, which acts on the linear motor 7 from the workpiece W via the second rotary positioner 6. (Step S5).

When the magnitude of the external force is smaller than a predetermined threshold (YES in Step S6), the robot controller 17 controls the welding robot 2 so as to start the welding the workpiece W (Step S3).

On the other hand, when the magnitude of the external force is larger than the predetermined threshold (NO in Step S6), the linear motor controller 14 controls the linear motor 7 so as to displace the second rotary positioner 6 in a direction in which the external force becomes smaller (Step S7). Steps S5 to S7 are repeatedly executed until the magnitude of the external force becomes smaller than the predetermined threshold (YES in Step S6). While the workpiece W are being welded by the welding robot 2, the detection of the external force by the external force detection unit 13 (Step S5), and the position adjustment of the second rotary positioner 6 by the linear motor controller 14 (Steps S6, S7) may repeatedly be performed.

After the workpiece is welded in the first posture, the rotational motor controller 15 rotates the workpiece W by controlling the rotational motor 10, and changes the posture of the workpiece W to the second posture (90 degrees, for example) (Step S4). And, Steps S5 to S8 are repeatedly executed.

Steps S4 to S8 are repeatedly executed until the welding of the workpiece W in all posture set in advance (0 degree, 90 degrees, 180 degrees, and 270 degrees, for example) is completed.

After the welding of the workpiece W in all postures has been completed (YES in Step S9), the robot controller 17 retracts the welding robot 2 to a position away from the workpiece W (Step S10). Next, the rotational motor controller 15 rotates the workpiece W by controlling the rotational motor 10 so that the workpiece W is moved back to the predetermined original posture (0 degree, for example) (Step S11).

The magnitude of the external force which acts on the linear motor 7 from the other end portion of the workpiece W via the second rotary positioner 6 is different according to the length, the weight, the rigidity, and the like of the workpiece W. If the target position at which the second rotary positioner 6 is held by the linear motor 7 is fixed, and the distance between the rotary positioners 5, 6 is fixed, the external force which exceeds the maximum torque may act on the linear motor 7 due to the change in the amount of bending of the workpiece W. For example, in such a case where the workpiece W has a length of several meters, and a weight of several tons, the external force acting on the linear motor 7 can be more than several hundred kilograms.

According to this embodiment, when the external force which is larger than the predetermined threshold acts on the linear motor 7 from the other end portion of the workpiece W via the second rotary positioner 6 due to the change in the amount of bending of the long workpiece W caused by the change in the posture of the workpiece W, the linear motor controller 14 controls the linear motor 7 so that the second rotary positioner 6 is displaced in a direction which allows the displacement of the other end portion of the workpiece W caused by the change in the amount of bending. With this, the magnitude of the external force acting on the linear motor 7 may be controlled to be smaller than the threshold. This prevents the excessive external force, which causes the change in the amount of bending of the workpiece W, from acting on the linear motor 7, and prevents generating the alarm and the linear motor 7 from stopping due to the external force exceeds the maximum torque.

Also, since the second rotary positioner 6 is displaced in accordance with the change in the amount of bending of the workpiece W, the excessive external force is prevented from acting not only on the linear motor 7, but also on components of the workpiece rotating apparatus 1 for supporting the workpiece W, such as the rotary positioners 5, 6, the tables 8, 11, and the like. Therefore, it is not necessary to improve the rigidity of the workpiece rotating apparatus 1, and it is possible to downsize the workpiece rotating apparatus 1.

Also, in such a case where various kinds of workpieces W are supported by the same workpiece rotating apparatus 1, the magnitude of the external force acting on the linear motor 7 from the workpiece W differs depending on the type of the workpiece W. According to this embodiment, in such a state where the workpiece W is held by the rotary positioners 5, 6, the external force acting on the linear motor 7 is detected, and the target position of the second rotary positioner 6 is adjusted, and therefore, the external force acting on the linear motor 7 can be controlled to be equal to or smaller than the threshold regardless of the type of the workpiece W.

In the above described embodiment, it may be possible to set an allowable range of the position of the second rotary positioner 6, and the linear motor controller 14 may generate the alarm when the second rotary positioner 6 moves outside the allowable range. The linear motor controller 14 calculates the position of the second rotary positioner 6 from a rotary angle of the linear motor 7, for example.

When the second rotary positioner 6 is largely displaced due to the change in the amount of bending of the workpiece W, the welding position on the workpiece W may be largely displaced in the horizontal direction. By this configuration, when the second rotary positioner 6 is displaced outside the allowable range, it is possible to generate the alarm so as to inform the operator of possibility that the welding positions on the workpiece W may be largely displaced.

In the above described embodiment, the linear motor controller 14 may displace the second rotary positioner 6 to a position where the magnitude of the external force detected by the external force detection unit 13 becomes zero or almost zero. In this case, the external force acting on the linear motor 7 is minimized.

Alternatively, the linear motor controller 14 displaces the second rotary positioner 6 to a position where the magnitude of the external force detected by the external force detection unit 13 becomes larger than zero and smaller than a predetermined threshold. In this case, it is possible to suppress the change in the amount of bending of the workpiece W within a range in which the external force acting on the linear motor 7 does not exceed the predetermined threshold.

In the above described embodiment, the external force detection unit 13 detects the load torque as the external force acting on the linear motor 7, however, instead, the external force acting on the linear motor 7 may be detected based on other measured value.

For example, the external force detection unit 13 may indirectly detect the external force acting on the linear motor 7 based on the amount of bending of the workpiece W. The larger the amount of bending of the workpiece W, the larger the external force acting on the linear motor 7 becomes. For example, the external force detection unit 13 detects the amount of bending of the workpiece W, and on the basis of the measured value of the amount of bending, and relationship between the amount of bending measured in advance and the external force, the external force detection unit 13 may estimate the external force acting on the linear motor 7. For example, the external force detection unit 13 includes a camera which is attached to the welding robot 2, and the amount of bending is detected from an image of the workpiece W acquired by the camera. Or, the external force detection unit 13 may calculate the amount of bending from the shape of the workpiece W obtained by the touch sensing of the welding robot 2.

Alternatively, the external force detection unit 13 may indirectly detect the external force on the basis of displacement amount of the second rotary positioner 6. In this case, the external force detection unit 13 includes a sensor, such as a camera, an optical displacement sensor, and the like, for detecting the amount of bending of the second rotary positioner 6.

When the load torque which exceeds the maximum torque acts on the linear motor 7 due to the change in the amount of bending of the workpiece, the linear motor 7 is not able to hold the second rotary positioner 6 at the target position, and the second rotary positioner 6 is displaced by a distance corresponding to the magnitude of the load torque according to the tensile force or the pressing force applied from the other end portion of the workpiece W. Therefore, it is possible to estimate the magnitude of the external force acting on the linear motor 7 from the displacement amount of the second rotary positioner 6.

In the above described embodiment, when the relationship between the posture of the workpiece W around the rotation axis A, and the target position of the second rotary positioner 6 where the external force acting on the linear motor 7 becomes equal to or smaller than the threshold value is known, the linear motor controller 14 may change the target position of the second rotary positioner 6 at the time of rotation of the workpiece W based on the relationship, and may displace the second rotary positioner 6 to the changed target position.

For example, with respect to the workpiece W which is once supported by the workpiece rotating apparatus 1, the relationship between the posture of the workpiece around the rotation axis A, and the target position of the second rotary positioner 6 is stored in the memory 16. Then, when the workpiece W is supported by the workpiece rotating apparatus 1 for the second time or later, every time the posture of the workpiece W is changed, the linear motor controller 14 displaces the second rotary positioner 6 to the target position corresponding to the changed posture of the workpiece W on the basis of the relationship stored in the memory 16. In this case, it is not necessary to detect the external force by the external force detection unit 13, and the target position of the second rotary positioner 6 can be adjusted by performing simpler processing and control.

In the above described embodiment, the robot controller 17 may adjust the welding positions of the welding robot 2 in response to the external force acting on the linear motor 7 from the other end portion of the workpiece W via the second rotary positioner 6.

By the change in the amount of bending of the workpiece W, the welding positions on the workpiece W is displaced in a horizontal direction and a perpendicular direction. For example, the robot controller 17 calculates the displacement amount of each of the welding positions on the workpiece W in the horizontal direction and the perpendicular direction on the basis of the load torque detected by the external force detection unit 13, the amount of bending of the workpiece W, or the displacement amount of the second rotary positioner 6, and on the basis of the calculated displacement amount, adjusts the positions where the welding robot 2 performs the welding. By this, regardless of the displacement of the welding position on the workpiece W, it is possible to accurately position the welding torch 2b at the welding position on the workpiece W.

In the above described embodiment, the first rotary positioner 5 rotates the one end portion of the workpiece W, and the second rotary positioner 6 makes the other end portion of the workpiece W follow the rotation of the one end portion. Instead, the second rotary positioner 6 has a rotary motor similarly to the first rotary positioner 5, and the rotational motor controller 15 may control the rotational motor 10 of the first rotary positioner 5 and the rotational motor of the second rotary positioner 6 so that the one end portion and the other end portion of the workpiece W is simultaneously rotated by a same angle.

The invention claimed is:

1. A workpiece rotating apparatus comprising:
   a first rotary positioner and a second rotary positioner which are arranged to face each other in a direction along an approximately horizontal rotation axis, and which hold, respectively, one end portion and the other end portion of a workpiece extending parallel to the rotation axis, and which can rotate the workpiece around the rotation axis;
   a linear motor which linearly moves the second rotary positioner in the direction along the rotation axis; and
   a motor controller which controls the linear motor to adjust a position of the second rotary positioner in the direction along the rotation axis,
   wherein the motor controller controls the linear motor so that magnitude of force acting on the linear motor from the other end portion of the workpiece via the second rotary positioner becomes smaller than a predetermined threshold,
   wherein the workpiece rotating apparatus further comprises an external force detection unit which detects the force acting on the linear motor from the other end portion of the workpiece via the second rotary positioner, and
   wherein, the motor controller changes a position where the second rotary positioner is held by the linear motor toward a direction with which the force detected by the external force detection unit becomes smaller, and the changing position is performed in a case where the magnitude of the force detected by the external force detection unit is larger than the predetermined threshold.

2. The workpiece rotating apparatus according to claim 1, wherein the external force detection unit detects load torque of the linear motor.

3. The workpiece rotating apparatus according to claim 1, wherein, the external force detection unit detects an amount of bending of the workpiece.

4. The workpiece rotating apparatus according to claim 1, wherein the first rotary positioner has a rotational motor which rotates the one end portion of the workpiece around the rotation axis, and,
the second rotary positioner holds the other end portion of the workpiece so as to be freely rotatable around the rotation axis.

5. A robot system comprising:
a workpiece rotating apparatus;
a welding robot which welds the workpiece supported by the workpiece rotating apparatus and
a robot controller which controls the welding robot,
wherein the workpiece rotating apparatus comprises:
a first rotary positioner and a second rotary positioner which are arranged to face each other in a direction along an approximately horizontal rotation axis, and which hold, respectively, one end portion and the other end portion of a workpiece extending parallel to the rotation axis, and which can rotate the workpiece around the rotation axis;
a linear motor which linearly moves the second rotary positioner in the direction along the rotation axis; and
a motor controller which controls the linear motor to adjust a position of the second rotary positioner in the direction along the rotation axis,
wherein the motor controller controls the linear motor so that magnitude of force acting on the linear motor from the other end portion of the workpiece via the second rotary positioner becomes smaller than a predetermined threshold, and
wherein the robot controller adjusts a welding position of the workpiece by the welding robot in response to the force acting on the linear motor from the other end portion of the workpiece via the second rotary positioner.

* * * * *